April 6, 1937.   F. A. WADE ET AL   2,076,328
METHOD AND MEANS FOR CONTROLLING COMPASSES
Filed June 6, 1932   5 Sheets-Sheet 1

INVENTOR.
FRANCIS A. WADE.
ADOLF URFER.
BY Stephen Gerstvik.
ATTORNEY

April 6, 1937.  F. A. WADE ET AL  2,076,328
METHOD AND MEANS FOR CONTROLLING COMPASSES
Filed June 6, 1932   5 Sheets-Sheet 2
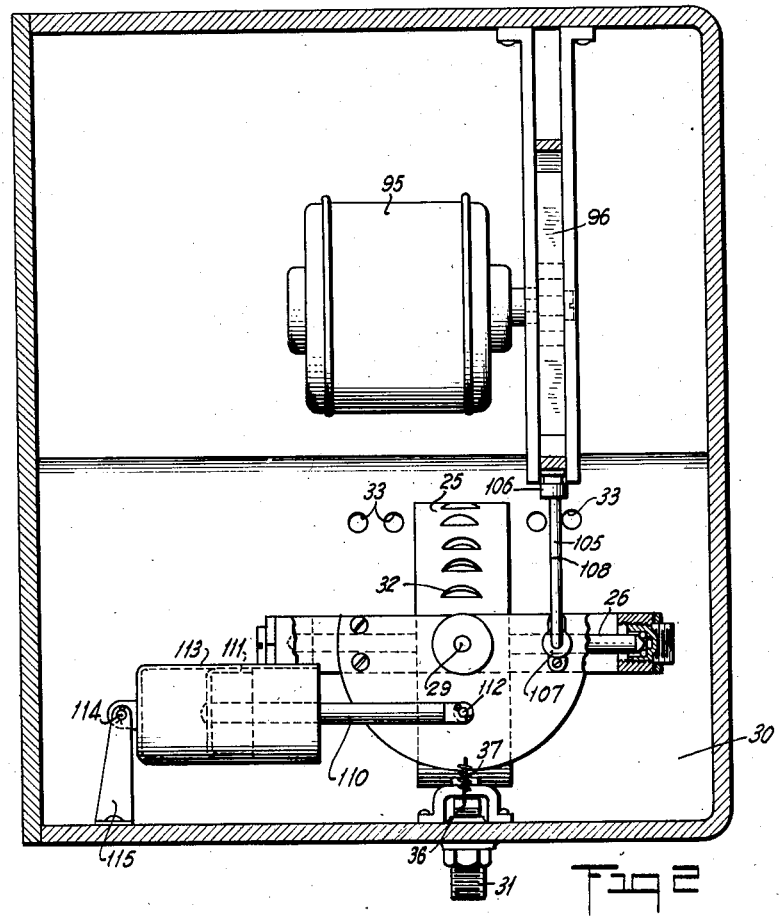
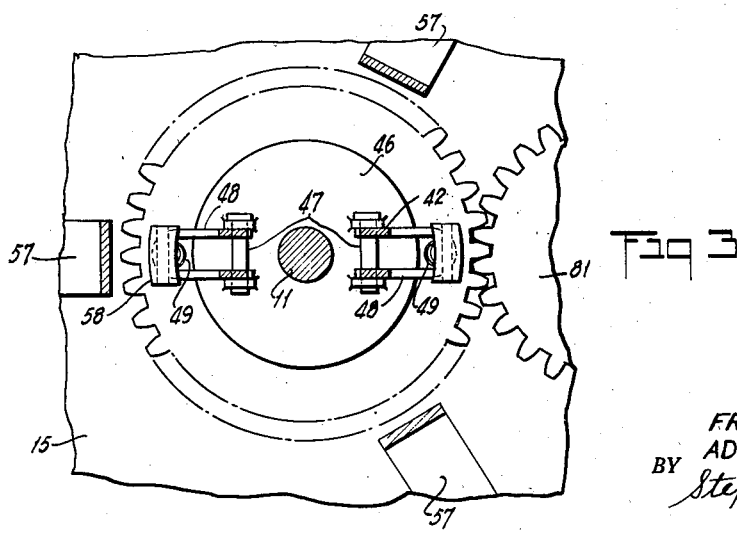
INVENTOR.
FRANCIS A. WADE
ADOLF URFER.
BY Stephen Gerstvik.
ATTORNEY INVENTOR.
FRANCIS A. WADE
ADOLF URFER
BY Stephen Gerstvik
ATTORNEY

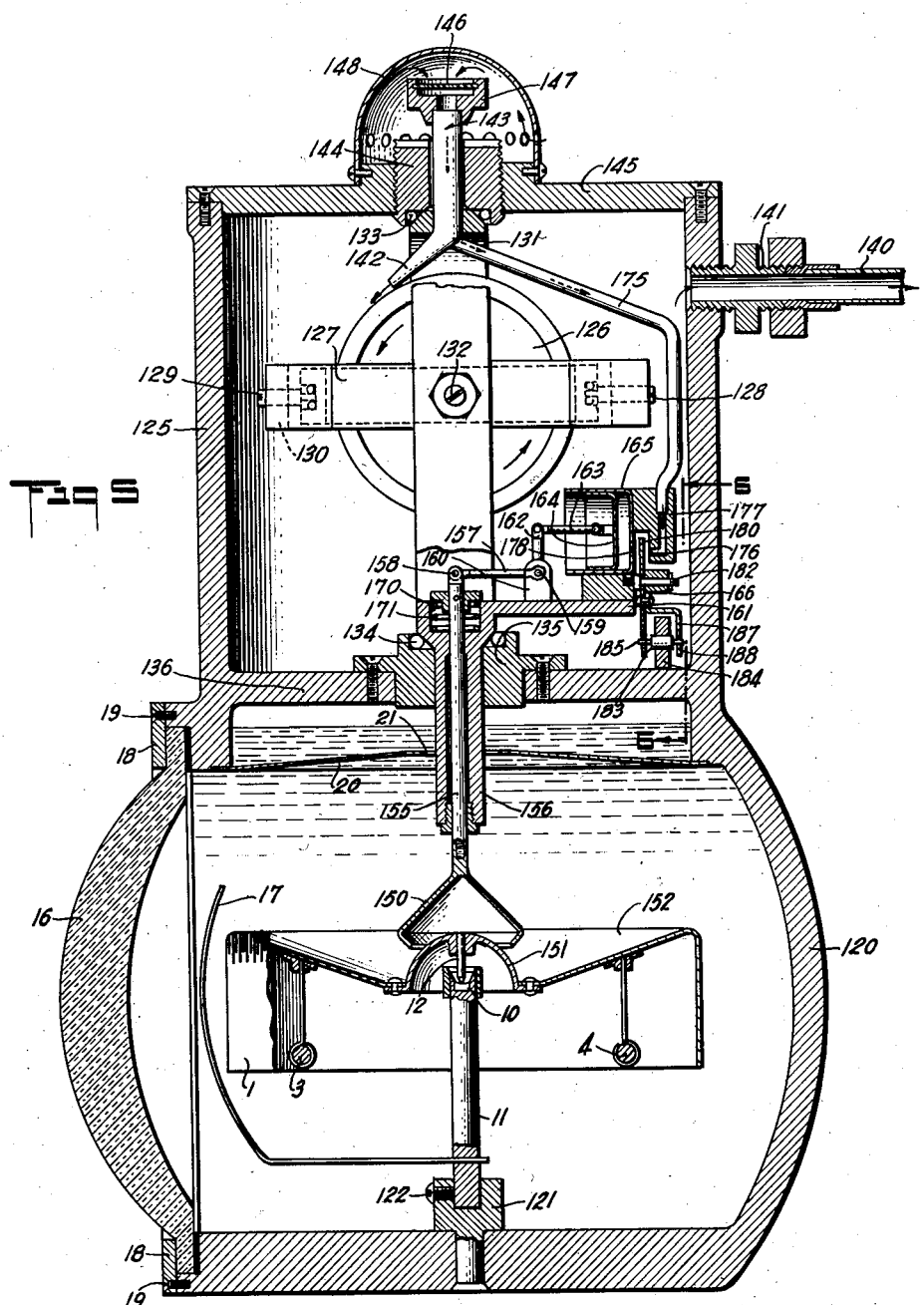

April 6, 1937.  F. A. WADE ET AL  2,076,328
METHOD AND MEANS FOR CONTROLLING COMPASSES
Filed June 6, 1932    5 Sheets-Sheet 5
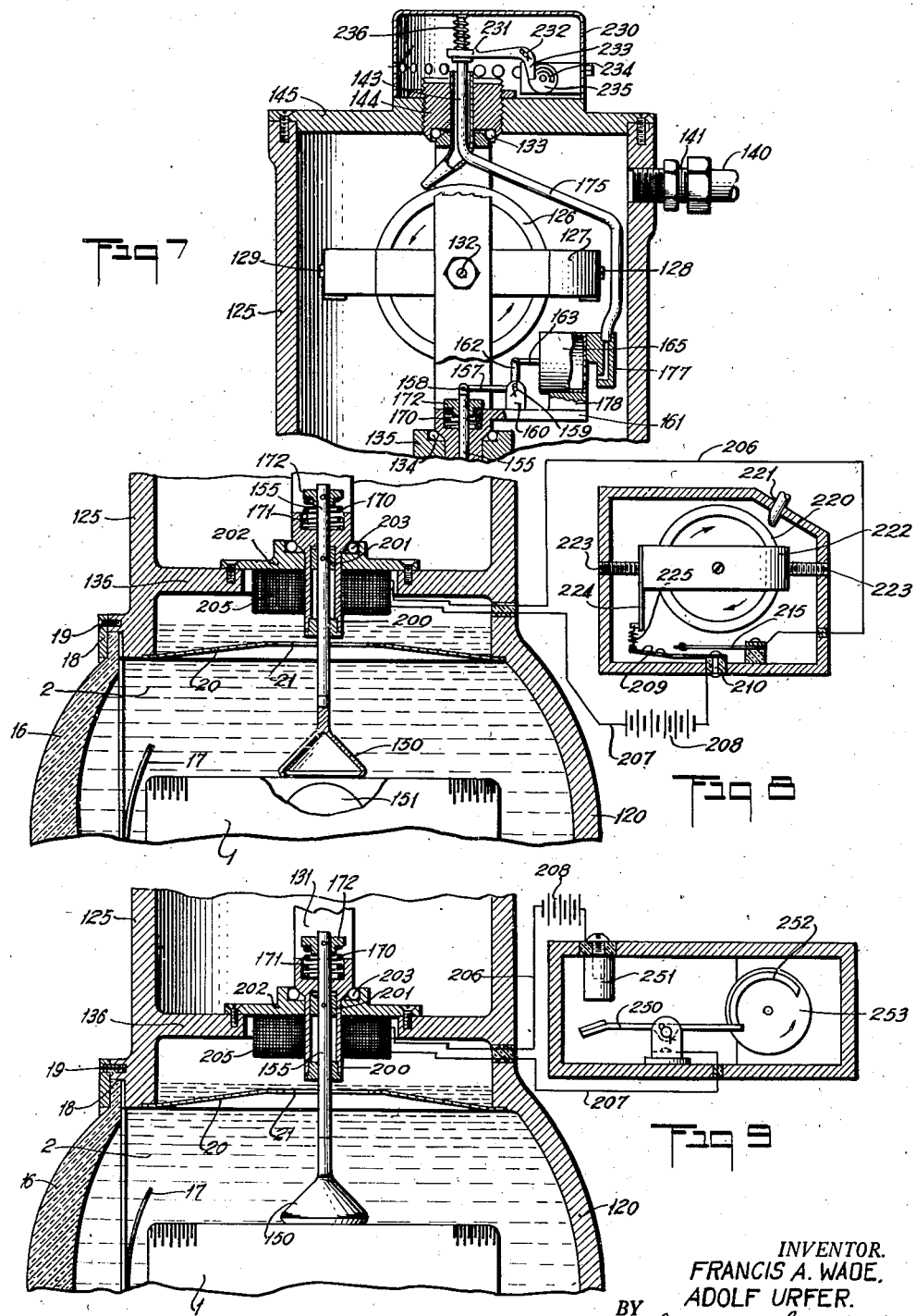
INVENTOR.
FRANCIS A. WADE,
ADOLF URFER.
BY Stephen Gerstvik.
ATTORNEY.

Patented Apr. 6, 1937

2,076,328

UNITED STATES PATENT OFFICE 2,076,328

METHOD AND MEANS FOR CONTROLLING COMPASSES

Francis A. Wade, Brooklyn, and Adolf Urfer, Richmond Hill, N. Y., assignors to Bendix Aviation Corporation, South Bend, Ind., a corporation of Delaware Application June 6, 1932, Serial No. 615,720

36 Claims. (Cl. 33—222)

The invention relates to compasses and, more particularly, to a novel and useful method and mechanism for controlling a magnetic compass mounted in a vehicle.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a longitudinal vertical section of a mechanism embodying a preferred form of our invention;

Fig. 2 is a transverse vertical section taken on line 2—2 of Fig. 1;

Fig. 3 is an enlarged fragmentary horizontal section on line 3—3 of Fig. 1;

Fig. 5 is a transverse vertical section of a modified embodiment of the invention showing the magnetic compass controlled by an azimuth gyroscope;

Fig. 7 is a fragmentary view similar to Fig. 5, showing another modification wherein gyroscopic control is periodically applied to the compass;

Fig. 8 is a modified form of the mechanism of Fig. 5, showing the compass-controlling clutch actuated by electrical means which are controlled independently of the azimuth gyro; and Fig. 9 is a view similar to Fig. 8, but showing an electrical timing control for the compass clutch.

Figure 4:
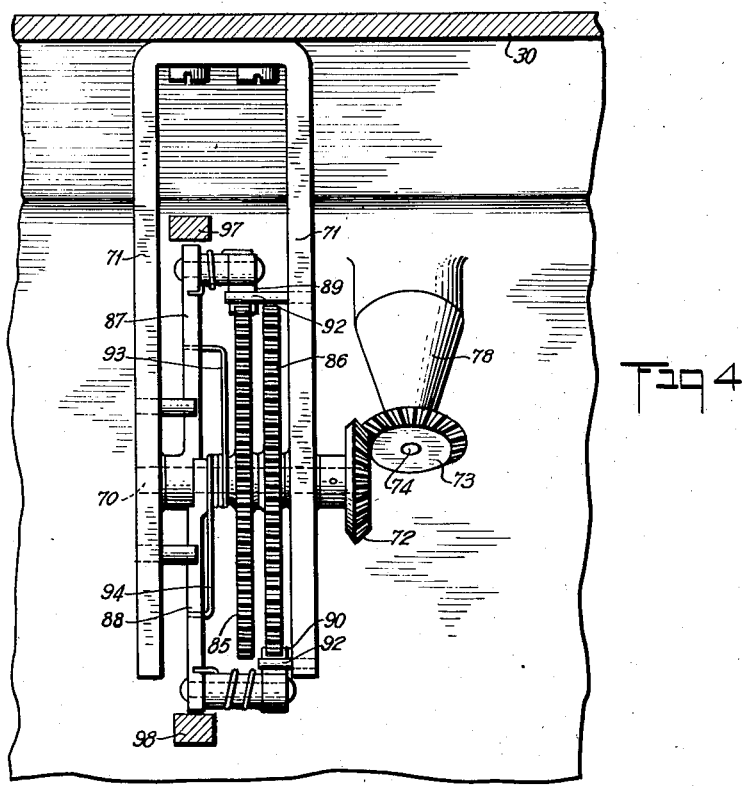
Fig. 4 is a transverse vertical section on line 4—4 of Fig. 1, looking toward the left.

The invention is directed to providing a novel and useful method and means for preventing and/or eliminating errors and deviations in magnetic compasses: particularly those errors and deviations to which a magnetic compass is subject when mounted in a conveyance or vehicle. The invention is especially directed to providing methods and means for controlling a magnetic compass during periods when the vehicle is turning or is deviating from a set condition or course.

The invention also includes the novel combination of a free directional gyroscope, a compass card rotatably mounted adjacent said gyroscope, a driving element on the gyroscope to turn in azimuth therewith and having a mechanical driving connection with said card to turn the latter as the gyroscope turns relative to its mounting, and means whereby said driving connection may be interrupted without disturbing the gyroscope.

More specifically, the invention seeks to control magnetic compasses in vehicles so that the errors generated by turning movements of the vehicle are automatically prevented from registering on the compass indicating means, so that the compass will always be oriented substantially correctly, regardless of the attitude or motion of the vehicle. For this purpose, our invention provides a magnetic compass which normally is permitted to respond freely to the magnetic influences of the earth field, but which is controlled independently of the earth field during turning movement of the vehicle. In other words, during normal straight-course movements of the vehicle, the compass receives its orientation from the earth magnetic field, while during turns the compass is maintained in correctly oriented relation by interposing an external or non-magnetic control factor which prevents or compensates for the deviations induced by the turning movements.

One object of our invention is to eliminate the well-known northerly turning error to which all magnetic compasses are subject. The invention further provides a compass which is always oriented substantially correctly and so can be used for steering the vehicle regardless of the course or the movements of the vehicle, and wherein the correct reading always appears on the same single indicating member.

In its present preferred embodiments, the external or non-magnetic compass control is derived from gyroscopic means which are sensitive to turning movements of the vehicle. The various well-known and peculiar characteristics of the gyroscope are employed for creating the desired compensating control factors. Broadly, the invention comprises the gyroscopic control of magnetic compasses for limited periods while leaving the compass free for response to earth-magnetic influences outside said periods. Ordinarily and preferably, the gyroscopic effect is utilized solely during turning movements of the compass-containing vehicle, and directly corrects or compensates for the errors and deviations which the turning movements create. However, the gyroscopic control may also be applied under other circumstances and relations, as, for example, by periodic timed applications of the controlling element so as to check and damp out compass deviations and thus maintain a substantially correct orientation thereof.

The invention is adapted for magnetic compasses generally, especially when used in vehicles or moving conveyances such as ships, land vehicles and air craft. Probably the greatest field for the invention is in its application to aerial navigation. The great speed and maneuverability of airplanes subject their magnetic compasses to serious errors during the rapid changes of course of the plane, frequently giving a compass reading which is temporarily far from the true magnetic course of the plane. By virtue of our invention, the compass indicates the true course of the plane at all times, substantially regardless of the deviation effects introduced by centrifugal forces, angular velocities, acceleration forces and the like.

The foregoing general description and the following detailed description as well, are exemplary and explanatory of the invention but not restrictive thereof.

Referring now in detail to the present preferred embodiments of the invention, shown by way of illustration in the accompanying drawings, as hereinbefore stated, different characteristics or effects of the gyroscope are preferably utilized for controlling the magnetic compass. In Figs. 1, 2, 3 and 4, a preferred embodiment of the invention is shown illustrating the employment of the precession effect of the gyroscope to prevent or compensate for errors induced in the magnetic compass readings.

The invention provides a magnetic compass of the conventional liquid type (Fig. 1) comprising the graduated compass card 1 suitably mounted in the body of damping liquid 2 and provided with the usual magnetic or sensitized bars 3 and 4 suitably suspended on either side of the card center. The compass card is provided with a suitable pivot bearing 10, preferably of the conventional jeweled type, formed on the top of the vertically disposed stud 11. A pivot pin 12 is centrally mounted in the compass card by means of pin housing 13, the pointed lower end of said pin fitting in and supporting the compass card upon the bearing 10.

It will be understood that the novel features of our invention are particularly adapted for magnetic compasses employed in steering vehicles, especially in aerial navigation. Accordingly, the magnetic compass is indicated as mounted in a suitable housing or frame 15 and forming part of the instrument assembly of the vehicle. In an airplane, for example, the longitudinal axis of the mechanism shown in Fig. 1 (i. e., the axis lying in the plane of the paper) will preferably be coincident with the fore-and-aft axis of the plane, while the reading-lens 16 of the liquid compass will be in the instrument panel of the plane. Thus the magnetic compass will be oriented with respect to the fore-and-aft axis of the plane and will thereby be effective for direct course laying and steering. The compass will be provided with a suitable lubber line 17 interposed between the reading glass and the compass card and seated in the base of the housing 15.

As indicated, the magnetic compass will be provided with the usual necessary structure for its support and maintenance in the vehicle. As embodied, the housing 15 comprises a substantially complete reservoir for the damping liquid around the compass card while the reading lens 16 is suitably secured to the outer face of the reservoir as by peripheral plate 18 and screws 19. The liquid reservoir may also be provided with the usual baffle plate 20 mounted above the compass card near the surface of the liquid, and having a central opening 21. A canopy 22 for preventing the card from leaving its pivot bearing may be suspended over the top of the pin bushing 13 by hangers 23 attached to the baffle plate 20.

Referring now to the means for non-magnetically controlling the movements and indications of the compass card during selected intervals, especially for the correction and prevention of errors due to movements of the vehicle, in the embodiment shown in Fig. 1, means are illustrated for employing the precession action of a gyroscope for the purposes stated. Briefly, in the present embodiment we utilize substantially the construction and operating principles of the well-known gyroscopic turn-indicator employed in modern aircraft. The precession movements of the gyroscope which take place during turning movements of the vehicle are proportional to and constitute a measure of the angular movement of the vehicle. By our invention we provide means for linking the gyroscope to the magnetic compass during turns and means for utilizing the precessive movement thereof to compensate for the deviations induced in the compass reading by said turning movements.

Referring now in detail to the gyroscope construction and the linkage thereof to the compass, a gyroscope (Figs. 1 and 2) is provided having a rotor 25 with a normally horizontal axis 26, said axis being parallel to the lateral or transverse axis of the vehicle. In the present embodiment, the gyroscope is mounted for two degrees of freedom, the rotor axis 26 being rotatably mounted in the horizontal gimbal ring 27, while said gimbal ring is rotatable about a fixed horizontal fore-and-aft axis, being suitably suspended on the fixed pivot members 28 and 29. Said pivot members comprise pointed, threaded pins suitably journaled in the frame extension 30 of the instrument housing 15, and in the vertical interior bracket 31, respectively. It will be clear that the gyroscope is thus rotatable about the fore-and-aft axis of the vehicle, while the rotor is also rotatable about its horizontal transverse axis 26.

The rotor of the gyroscope may be driven by any suitable or conventional means such as an electro-magnetic drive. In the present preferred embodiment, however, the rotor is shown driven by an air blast through nozzle 31 which is seated in the bottom of the instrument casing and directs its blast substantially tangentially against the vanes 32 on the periphery of rotor 25. The nozzle is variably positionable vertically with respect to the rotor, having an exterior threaded surface which engages a cooperatingly threaded socket in the casing 30. Air under pressure may be supplied to nozzle 31 exteriorly of the casing from any suitable source (not shown) such as an air pump, or a Venturi tube. Suitable openings 33 are provided in the casing 30 for permitting escape of air from the casing.

Means are provided for centralizing the gyroscope and maintaining the rotor axis normally horizontal. As embodied, a segmental plate 35 is fixed to the gimbal ring 27 at the pivot point 29, so as to turn with the gimbal ring as the latter rotates about its fore-and-aft axis. A centralizing spring device comprising spring finger 36 is fast at one end to the floor of housing 30, while the free end thereof is connected radially to the bottom of plate 35 by a vertically-disposed coil spring 37 fast to a pin 38 near the periphery of the plate. While we have shown spring means for centralizing the gyroscope, it will be understood that a pendulum or other suitable centralizing means may be employed.

In the gyroscope construction shown in Figs. 1 and 2, it will be clear that a turning movement of the vehicle will induce a precession of the gyroscope about the fore-and-aft axis of the gimbal ring 27. For example, with the direction of rotation of the rotor shown in Fig. 1, a clockwise turn of the airplane about its rudder axis will induce a precession of the gyroscope rotor in counter-clockwise sense viewed in the direction in which the ship is flying or in the direction of Fig. 2. That is, if the airplane makes a right-hand turn, the gyro rotor will tilt, the upper edge of the rotor moving downwardly to the left in Fig. 2, while the lower edge of the rotor moves upwardly and to the right. On the other hand, if the ship describes a left-hand turn, the gyro will precess in the opposite sense.

It will further be understood that the amount of force of the precession will be directly proportional to the angular velocity or rate of turn of the ship, and that the duration of the precession will be coincident with the ship's turning. The centralizing spring will operate to oppose the precession movements and will instantaneously return the rotor axis 26 to horizontal when turning ceases.

The invention comprises means for linking the precession movements of the gyroscope to the compass so that during turning movements of the ship the compass will be subjected to gyroscopic control. As embodied, clutch means are provided for gripping the compass card at the instant the ship commences to turn, the clutch being actuated by the precession movement of the gyroscope. The clutch is likewise adapted for instantaneous release upon cessation of turning movement, thereby again freeing the magnetic compass to magnetic influences. In the illustrated form, the clutch connection to the gyroscope and the actuation thereof is through electrical means, but it will be understood that the clutch actuation and control from the gyroscope may be effected by straight mechanical linkage; by hydraulic, pneumatic or other suitable transmission means.

As shown, the lower portion 40 of the pin bushing or housing 13 on the compass card is globular and the outer surface thereof constitutes the driven member of the clutch mechanism hereinafter described. A pair of cooperating clutching jaws or grippers 41 are mounted on the upwardly and outwardly inclined arms 42 of a pair of bell cranks which are pivotally supported on the upper surface of a pinion 43 which surrounds and is loosely revolvable about the compass-supporting stud 11. The stud 11 is fixed to the base of the casing 15, the lower end 44 of the stud being screw-threaded into a suitable socket in said base. A shoulder 45 on the stud bears against the upper surface of said base and forms a supporting seat for the pinion 43. The upper surface of the pinion is cut away near the periphery to provide an inner raised platform 46 (Fig. 3) for supporting the bell crank pivots 47, whereby the horizontal lever arms 48 of the bell cranks project radially outwardly beyond the raised platform and overlie the indented peripheral surface of the pinion. Coil springs 49 are attached to the underside of either arm 48 and urge same toward the pinion, to which the lower ends of the springs are fast, thereby normally holding the clutch members 41 out of contact with the member 40 of the compass card.

The embodied means for moving the clutch into driving engagement with the compass card comprises an annular coil or solenoid 55 which is mounted in a ring 56 and held above the arms 48 of the bell cranks by suitable brackets 57. The solenoid is of such diameter that it loosely surrounds the stud 11 and the outwardly and upwardly inclined lever arms 42, while the outer ends of lever arms 48 underlie the solenoid and are provided with magnetizable armature members 58. It will be clear that energization of the solenoid will draw the members 58 upwardly thereby throwing the gripping member 41 into contact with driven member 40.

Means are provided for energizing the solenoid, and in accordance with the invention, said energization is controlled by the precession of the gyroscope. As embodied, circuit wires 60 and 61 lead from the solenoid, through suitably insulated supports to a battery 64, or other suitable source of electrical energy. Wire 60 is grounded to the metal casing at 65, while wire 61 leads to contact post 66 in rear of the plate 35 and just above leaf spring 36, the fixed end of which is likewise grounded to the frame at 67. It will be clear that spring 36 and post 66 or a normally open switch in the solenoid circuit and that the switch will be closed and the circuit energized whenever spring 36 is raised to contact with the post through precession movement of the gyro. Accordingly, the compass card is seized and held by the clutch members 41 as soon as the gyroscope precesses in either direction and the clutch is instantly released as soon as precession ceases and the gyro returns to horizontal.

The embodied means for transmitting a corrective or compensating motion from the gyro to the compass card during precession of the former comprises, broadly, a mechanically actuated gearing train adapted to drive or rotate the compass card through means of the clutch already described. The gearing train receives its power from a prime mover of suitable construction which is linked to the gearing train to drive the same through means controlled by precession of the gyroscope.

In detail, a driven shaft 70 (Figs. 1 and 4) is rotatably suspended from the top of the instrument housing by suitable brackets 71 and is provided with a keyed bevel pinion 72 at its rear end. Said pinion engages pinion 73 to drive shaft 74, which transmits its motion to shaft 75 through gears 76 and 77 at the top of the housing. Shaft 74 may be provided with suitable sleeving 78. Shaft 75 extends vertically through the housing and is suitably journaled at 79 in the bottom 15 thereof. Pinion 80 is fixed to the lower end of shaft 75 and transmits the rotary movement thereof to pinion 43 through intermeshing idler 81. Thus it will be clear that rotation of shaft 70 is transmitted to pinion 43 through suitable gearing to pinion 43 and, when the solenoid is energized, the clutch will transmit this turning movement to the compass card.

Means are provided for rotating shaft 70 in either direction an amount proportional to the precessive force of the gyro and coincident with the duration of such precession. As embodied, two side-by-side ratchet wheels 85 and 86 are mounted on shaft 70 and keyed to rotate therewith. These ratchets are formed with their teeth arranged in opposite senses, whereby rotary movement in either direction may be imparted to shaft 70. Diametrically opposed arms 87 and 88 are independently mounted on shaft 70 adjacent the ratchet wheels and are loosely rotatable with respect to the shaft. These arms carry pawls 89 and 90, respectively, at their outer ends and both pawls are normally restrained from engagement with their cooperating ratchet wheels 85 and 86. For this purpose, the inner faces of the pawls are formed with suitable indentations 91, while the pawls normally overlie and rest upon cooperating pins 92 projecting from the supporting brackets 71. Furthermore, the arms 87 and 88 and their pawls are normally urged away from the ratchet wheels by springs 93 and 94, respectively, so that both pawls are normally free from engagement with their ratchet wheels.

Driving force may be transmitted to either pawl arm from a continuously operated prime mover such as electric motor 95. The drive from the motor to the pawl is preferably intermittent and of limited stroke, and for this purpose an A-shaped frame 96 is eccentrically attached to the motor shaft, as by the Scotch yoke connection 97, whereby the A-frame will oscillate continuously through a definite path. The A-frame is provided with two actuating fingers 97 and 98 projecting beyond its cross-piece, said fingers being adapted to engage the pawl arms and intermittently advance one pawl or the other into engagement with its ratchet wheel. The A-frame mounting and its stroke are such that both fingers 97 and 98 are normally maintained out of engagement with either pawl arm. However, if the A-frame be raised or lowered from its normal path of oscillation, one of its driving fingers 97 or 98 will engage the adjacent pawl arm and the pawl will be pushed along the pin 92 and into engagement with the ratchet teeth. The oscillating movement of the finger (98 for example) will then advance the pawl 92 step-by-step (thereby rotating the shaft 70) while contact between the finger and pawl arm is maintained. In the meantime, the diametrically opposite pawl is maintained free from engagement with its ratchet wheel and also with the other driving finger of the A-frame.

Means are provided whereby the precession of the gyroscope will lower or elevate the A-frame, thereby bringing finger 97 or 98 into contact with its respective pawl arm 87 or 88. As embodied, a vertically disposed arm 105 is pivotally attached to the lower surface of the A-frame 96 preferably by a universal connection such as ball and socket joint 106. The lower end of arm 105 is similarly connected to the plate 35 at 107, said connection being near the upper edge of the semicircular plate 35 and relatively near the periphery thereof, so that the arm 105 will receive a substantial up and down movement when the plate turns. The arm is preferably variable in length, as by a suitable turn buckle joint 108, to adjust the stroke of the plate 35 with relation to the A-frame 96.

It will be clear that the stroke of the pawl will be proportional to the precession of the gyroscope. That is, when the arm 105 is raised by plate 35, for example, the distance which pawl 90 will be advanced by finger 98 depends upon the height to which said finger is lifted. If the precession of the gyro is relatively slight, finger 98 will rise only a slight distance and will contact with arm 88 during only a short portion of its stroke. However, if the finger rises higher, the contact thereof with arm 88 lasts longer and the stroke of pawl 90 is correspondingly increased. Thus the amount of the precession is reflected in the stroke of the pawl and the rotation imparted to shaft 70 will be a function of the precession and therefore a function of the rate of turn of the vehicle.

Means are provided for damping the throw of the plate 35 under precession movements of the gyro. As embodied, a piston 110 having suitable head 111, is pivotally mounted on plate 35 at 112 and is adapted for cushioning movements in suitably constructed air cylinder 113. The far end of the cylinder is pivotally supported at 114 by bracket 115.

The operation of the hereinbefore described embodiment will be clear from the detailed description thereof, but may be briefly summarized as follows:

The compass card is normally mounted for free response to the magnetic influence to the earth field and under normal conditions of flight will correctly indicate the magnetic course of the vehicle. However, when the craft or vehicle commences to turn from its straight course, the gyro immediately precesses an amount proportional to the rate of turn and continues such precession throughout the turning movement. As soon as turning movement commences, the compass card is seized by the clutch and restrained from following the turning movement of the vehicle. At the same time the gyro throws one of the pawl and ratchet units into contact with the oscillating A-frame and such contact is maintained throughout the turning movement. The pawl and ratchet means thus effect a rotation of the compass card, through the gear train described, and said rotation will be in the sense opposite to the compass deviation induced by the turning of the vehicle and in an amount equal to said deviation. Consequently, during the entire turning movement, the magnetic compass will continue to register a true course of the vehicle just as though no turning were taking place. As soon as turning movement and concomitant precession cease, the pawl will be disengaged from the oscillating finger and the rotation of the compass card will cease. At the same instant, the solenoid circuit will be broken and the compass surrendered wholly to magnetic control.

By virtue of the construction described, substantially all compass deviations chargeable to movement of the vehicle are prevented or compensated for. For example, northerly turning errors, undue oscillation of the magnetic element, lag in indication and drag of the damping liquid in the compass are eliminated. The compass can thus be used for steering, regardless of the course or movements of the vehicle and in consequence the accuracy of navigation and the smoothness of travel are greatly augmented.

Our invention comprises another embodiment of the basic method and means for non-magnetically controlling a magnetic compass, wherein the characteristic "rigidity-in-space" or gyroscopic inertia of a gyroscope is utilized. In this modification of the invention, the errors and deviations induced in the readings of the magnetic compass by movements of the airplane or other vehicle are automatically prevented or compensated for by linkage to and control from and "azimuth gyro" i. e., a gyroscope mounted for three degrees of freedom and therefore adapted to preserve its predetermined position in space irrespective of turning movements or irregularities in flight of the plane.

The present preferred embodiment employing the "rigidity-in-space" characteristic of the gyro is illustrated in Fig. 5. As embodied, a magnetic compass of the liquid type hereinbefore described is provided having the same general features of conventional construction shown in Fig. 1, and like reference numerals are applied to similar parts in Fig. 5. A generally cylindrical or semi-globular casing 120 is provided for holding the compass and the damping liquid, supporting stud 11 being mounted in the base of the casing by socket 121 and set screw 122.

An azimuth gyro is mounted above the compass and is contained in and supported by an airtight cylindrical casing 125 which preferably constitutes an integral extension of the compass casing 120. The gyroscope comprises a rotor 126 set to rotate in a predetermined vertical plane, which preferably is the vertical plane through the fore-and-aft axis of the airplane. Accordingly the rotor turns on a horizontal axle, the ends of which are rotatably supported by horizontal gimbal ring 127. Ring 127 is in turn rotatable about a central horizontal axis, being supported by suitable ball bearings on axis pins 128 and 129. The supports 128 and 129 are themselves mounted in an outer gimbal ring 130 which is rotatable about a horizontal axis at right angles to the plane of the rotor, said ring 130 being rotatably supported in the exterior gimbal ring 131 at 132 and the diametrically opposite bearing (not shown).

The exterior gimbal ring 131 is mounted for rotation about its vertical axis, for this purpose being provided with a suitable ball bearing 133 at its tangency with the top of the casing 125 and is similarly supported by ball bearing 134 in bushing 135 which is seated in the bottom 136 of said casing.

The rotor of the gyroscope may be maintained in motion by any appropriate means. As embodied, a pneumatic drive is provided for the rotor 126, the interior of casing 125 being maintained below atmospheric pressure by a suction tube 140 which is suitably supported in the wall of casing 125 by screw-threaded connection 141. The tube 140 may be connected to any suitable exhausting means, (not shown) such as a Venturi tube, suction pump, or the intake manifold of the vehicle motor. An air nozzle 142 is positioned to drive rotor 126, the periphery of which may be provided with suitable vanes, as shown in Fig. 2 for example. The nozzle 142 communicates with the atmosphere by conduit 143 which projects upwardly through a suitable central opening in screw-threaded bushing 144 in the top 145 of casing 125. Suitable means are provided for straining the air admitted to conduit 143, the upper end thereof having a screen 146 attached thereto by collar 147. A perforated dome 148 is attached to the top 145 surrounding and protecting the open end of conduit 143. It will be clear that conduit 143 is rotatable with gimbal ring 131 relatively to casing 125. The nozzle, so positioned, assists in centralizing the rotor.

Means are provided for linking the compass card to the hereinbefore described gyro mechanism when relative movement occurs between the vehicle and the gyroscope (disregarding the whirling movements of the rotor itself, which of course, is in continuous rotation). As embodied, a conical clutching member 150 is adapted to cooperate with the hemispherical member 151 located centrally of the concave top 152 of the compass card. Clutching member 150 is, as shown, normally suspended above member 151 and out of contact therewith, whereby the compass card is normally free for simple magnetic operation.

However, means are provided for vertically moving member 150 to contact with and grip the compass card, said means being controlled by movement of the gyroscope. As embodied, member 150 is suspended from vertical rod 155, said rod being axially movable in sleeve 156 which constitutes a downward projection integral with rotatable gimbal ring 131. Means for axially moving the rod 155 comprises bell crank 157, which is pivotally attached to the upper end of the rod at 158. The bell crank is pivotally mounted at 159 upon bracket 160, said bracket being fixed to the horizontally disposed platform 161. The vertically disposed arm 162 of the bell crank is pivotally joined to the piston rod 163 to which piston head 164 is attached. The piston head is slidably mounted in piston cylinder 165, said cylinder also being supported upon platform 161 by intervening block 166 which is fixed to said platform.

The platform 161 constitutes an integral horizontal extension of gimbal ring 131 and is rotatable with said gimbal ring. It will be clear, therefore, that rotation of the gimbal ring 131 with respect to casing 125 will effect rotation of the piston assembly and rod 155 therewith, while movement of the piston in its cylinder will cause axial movement of rod 155 and operation of the clutching mechanism. As stated, the clutch is normally disengaged, and for this purpose a helical spring 170 encircles the upper end of rod 155 and is seated in cylindrical depression 171 in the gimbal ring. A collar 172 is fixed to rod 155 at its upper end and the spring presses against the collar, thereby urging the rod 155 upwardly to maintain the clutch in disengaged position.

The embodied means for actuating piston 164 to operate the clutch, comprises an air conduit 175 which communicates with the atmosphere through conduit 143, while its other end is subject to the low pressure in casing 125, through the passage 176 in housing 177. A suitable opening 178 is provided in the end of cylinder 165, said opening being in alignment with the mouth of passage 176, but spaced therefrom, so that the air blast from conduit 175 may enter the piston cylinder and force the piston to the left as viewed in Fig. 5.

The invention provides means for permitting actuation of the clutch piston only when relative movement occurs between the gimbal ring of the gyroscope and the relatively fixed casing 125. As embodied, the passageway between conduit 176 and the piston cylinder is normally closed by a valve or interponent 180, said valve being movable to clear the opening 178 in the end of the cylinder when the gimbal ring 131 rotates on its vertical axis.

Figure 6:
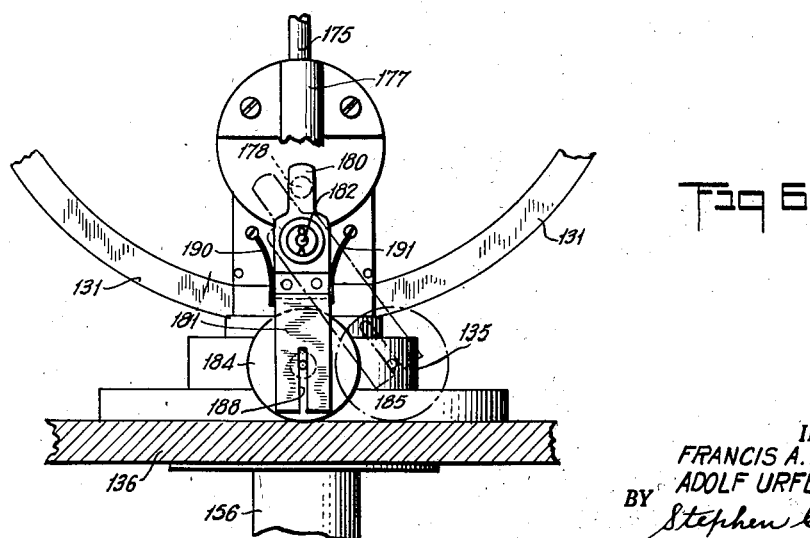
Fig. 6 is a fragmentary enlarged vertical section taken on line 6—6 of Fig. 5.

Means for moving the valve 180 comprise an arm 181 (Fig. 6) pivotally supported at 182 on casing 177 and provided at its lower end with a vertical slot 183. A friction roller 184 rides on the flat upper surface of plate 136 of the casing and is in rotatable engagement with lever 181 through the roller axle 185 which slides in the slot 183. A cooperating bracket 187 overlies the roller and extends downwardly parallel to the outer face thereof, said bracket being vertically slotted at 188 to receive the outer end of axle 185. Means for normally holding the lever 181 in valve closing position comprise centering springs 190 and 191 which are fixed to the casing block 177 and engage the lever upon either side.

It will be clear that so long as the gimbal ring maintains its normal position in the vertical plane transverse to the fore-and-aft axis of the vehicle, the lever 181 will remain vertical and valve 180 will be closed. However, if the gimbal ring turns out of its normal transverse plane, the frictional drag of roller 184 on surface 136 will rock lever 181 and uncover opening 178, thereby permitting the blast of air to enter the piston cylinder and force the piston to the left.

In the operation of the hereinbefore described mechanism, when the aircraft or other vehicle in which the compass is mounted is following a straight course, the rotor of the gyroscope will lie in the vertical plane through the fore-and-aft axis of the vehicle and the clutch 150 will be disengaged, thereby leaving the compass card free to earth-magnetic influences. However, when the vehicle commences to turn, the "rigidity-in-space" or gyroscopic inertia of the gyroscope will cause the gyro to maintain its original position in space, thereby effecting relative motion between the casing 125 (which is fixed to the vehicle) and the platform 161 which is fixed to the gimbal ring 131 of the gyro. The relative rotation of platform 161 will be proportional to and in the sense opposite to the turning of the vehicle. At the instant that turning movement commences, valve 180 will start to open, and the clutch 150 will seize the compass card, thereby subjecting the card to the rotational movement of the gyroscope. As a result, the compass card is prevented from deviating during turning movement of the vehicle, but is seized and maintained on its true magnetic indication throughout the turning movement. When said turning movement ceases, the valve 180 automatically closes and the clutch is released, thereby surrendering the compass again to the magnetic influence without loss of proper indication or undue oscillation of the card.

In the hereinbefore described mechanism for utilizing the "rigidity-in-space" characteristic of the gyroscope, we have shown and described pneumatic means for actuating the gyro and its clutch connection to the compass. It will be understood, however, that the gyro drive and/or the clutch actuation could be effected by electrical or mechanical contrivances, and we wish it understood that such modifications are within the scope of our invention. In an electrical construction, for example, the clutch could be actuated by a solenoid, which would be energized by closing of a circuit through contacts engaged by relative movement of the gyro and vehicle.

Our invention comprises a further modification (Fig. 8) wherein the azimuth gyro mechanism illustrated in Fig. 5 is selectively connected to control the magnetic compass by means independent of the movements of the azimuth gyro itself. In the present preferred embodiment of this modification, the clutch which connects the azimuth gyro to the compass card is controlled independently of the azimuth gyro by means likewise sensitive to turning movements of the vehicle.

As embodied, the clutch is actuated by a solenoid, said solenoid being energized through the precession movements of a second gyroscope, which may and preferably will be a turn-indicator gyroscope. In its general aspects, the clutch control of the compass card will be generally similar to that shown in Fig. 1.

In detail, the shaft or rod 155 is connected to the gimbal ring 131 of the superimposed azimuth gyro shown in Fig. 5 and said shaft 155 is adapted to turn with gimbal ring 131 as hereinbefore described. The shaft is mounted for axial movement with respect to the gimbal ring, being provided with the helical spring seating 170 described in connection with Fig. 5. A cylindrical housing 200 forms an integral downward extension of gimbal ring 131, thereby forming a guide for the shaft, which is provided with a guiding bushing 201 slidable within the cylindrical housing. The gimbal ring and shaft assembly are rotatably supported upon the seating member 202 by ball bearings 203.

A solenoid coil 205 surrounds the cylindrical housing 200, the axial shaft 155 itself constituting the armature of the solenoid. The energizing circuit of the solenoid comprises wires 206 and 207, the latter communicating with a source of current 208 and thence leading to switch arm 209 which comprises a leaf spring fixed at one end 210 to the casing 211 of the turn-indicator gyroscope. The other circuit wire 206 is connected to contact arm 215 of the switch, mounted above and normally out of contact with arm 209.

It will be clear that the gyroscope mounting and connections of the switch thereto are generally similar to the corresponding mechanism shown in Fig. 1. Briefly the gyro rotor 220 is driven by an air blast from nozzle 221, the rotor being normally in the vertical fore-and-aft plane of the vehicle and rotatable on a horizontal axle which is mounted in horizontal gimbal ring 222. The gimbal ring is rotatable about the horizontal fore-and-aft axis through supporting pins 223 and is provided with plate 224 which transmits precession movements of the gyro to switch arm 209 through centering spring 225.

In the operation of the modification shown in Fig. 8, it will be clear that the shaft 155 through its connection to gimbal ring 131, will be turned relatively to casing 125 during turning movements of the vehicle. These turning movements will simultaneously cause the turn-indicator gyro to precess, thereby energizing the solenoid and closing the clutch 150. Thus the superimposed azimuth gyro will be used solely for turning the compass card, while the clutch actuation will be controlled by the precession movement of the turn-indicator. It will be understood that the turn-indicator gyro 220, etc., may be the usual turn-indicator used in aerial navigation and utilized for the clutch control in addition to its indicating action, or, if desired, a separate or auxiliary gyroscope 220 may be provided for controlling the clutch 150 only.

In the hereinbefore described mechanism, we have disclosed methods and means for controlling magnetic compasses in direct relation to the movements of the vehicle. However, our invention further comprises a method and mechanism for periodically subjecting a magnetic compass to external of gyroscopic control independently of the vehicle movements or other deviating factors. More specifically, we provide means for periodically applying gyroscopic control to the magnetic compass so as to damp out or regularly and intermittently prevent or compensate for deviations and fluctuations arising in the magnetic compass indications.

For example, in addition to the relatively large reviations induced in magnetic compasses by sudden or protracted turning movements of the vehicle, the magnetic elements of the compass are subjected to disturbances and oscillations whenever the vehicle is accelerated or makes any change in its speed or direction. The liquid surrounding the compass oscillates and exerts a deviating "drag" on the compass card, while local magnetic influences may also cause temporary aberrations in the compass indication.

By our invention, the gyroscope is intermittently and periodically linked to the compass card, thereby exerting a steadying influence upon the compass at all times. The gyro itself is designed to maintain a fixed position in space and thereby indicate a predetermined direction over several minutes without substantial error. By locking the compass card to the gyroscope for a given relatively short time period and periodically releasing it, the direction indicated by the compass card will at all times be substantially the magnetic heading of the vehicle. The make and break of the gyro contact will permit the compass to respond to the influences of the earth-magnetic field while it is periodically stabilized and damped by the gyroscope. On the other hand, the gyroscope will never be continuously connected to the compass for a period longer than one during which the gyroscope will give accurate directional indication.

In Fig. 7 we illustrate one embodiment of mechanism for periodically linking the compass card to the direction-indicating gyroscope. As embodied, the gyroscope shown in Fig. 7 is of the azimuth gyro type illustrated in Fig. 5, having three degrees of freedom and driven by an air blast. The same reference numerals applied to corresponding parts in Figs. 5 and 7 and such parts need not be redescribed in connection with Fig. 7. The means for periodically connecting the clutch 150 to the azimuth gyro comprises devices for actuating the piston 164 to close and open clutch 150 through relatively short time intervals. For this purpose, the air duct 175 is extended upwardly through the surrounding air duct 143 and projects above the top thereof into the air dome 230. The admission of air into duct 175 is controlled by a valve 231 which is operated by suitable timing mechanism to periodically open and close the end of the duct. As embodied, valve 231 comprises the end of a bell crank lever pivoted at 232 and having its vertical arm 233 in contact with a timing cam 234 on a rotating disc 235. Said disc may be continuously rotated at the proper speed by a suitable prime mover (not shown) such as a motor or clock spring. If desirable, means may be provided for selectively varying the timing interval. The valve 231 is urged to closed position by compression spring 236.

It will be clear that the timed operation of valve 231 induces intermittent blasts of air through the conduit or duct 175 and therethrough into the piston chamber. It will be noted that in this modification, no valve means are provided in front of the opening 178 in the piston chamber.

A modified form of mechanism for actuating clutch 150 in timed relation between the gyroscope and the compass card shown in Fig. 9, comprises an electrically operated assembly. As embodied, the clutch may be provided with solenoid-actuating means similar to those shown and described in connection with Fig. 8. The solenoid circuit may be made and broken by a time controlled interrupter comprising contact lever 250 which closes the circuit by engagement with contact 251 and is raised into contact therewith by cam 252 on timed rotating disc 253. It will be clear that the operation of the mechanism in Fig. 9 is substantially the same in principle as that of Fig. 7.

The invention in its broader aspects is not limited to the specific mechanisms shown and described but departures may be made therefrom within the scope of the accompanying claims without departing from the principles of the invention and without sacrificing its chief advantages.

What we claim is:—

1. A mechanism for controlling a compass, including in combination, a magnetic compass mounted in a vehicle and adapted to normally respond freely to magnetic influences, a gyroscope mounted in the vehicle and having two degrees of freedom with respect thereto, and means responsive to precession movements of the gyroscope for controlling the compass.

2. A mechanism for controlling a compass, including in combination, a magnetic compass mounted in a vehicle and adapted to normally respond freely to magnetic influences, a gyroscope mounted in the vehicle, a driving member, and means controlled by precession movements of the gyroscope for connecting the compass to said driving member during turning movements of the vehicle.

3. A mechanism for controlling a compass, including in combination, a magnetic compass mounted in a vehicle and adapted to normally respond freely to magnetic influences, a gyroscope mounted in the vehicle, driving means for rotating the compass in azimuth, and means actuated by precession of the gyroscope for controlling said driving means.

4. A mechanism for controlling a compass, including in combination, a magnetic compass mounted in a vehicle and adapted to normally respond freely to magnetic influences, a gyroscope mounted in the vehicle, and means controlled by the gyroscope for turning the compass in azimuth proportionately to precession movements of the gyroscope.

5. In an airship, in combination, a magnetic compass having a card, a gyroscope having its axis of spin normally horizontal and at right-angles to the longitudinal axis of the ship, means for rotating the compass card, and a clutch controlled by means responsive to precession movements of the gyroscope for connecting the compass card to the rotating means during turning movements of the ship.

6. A mechanism for controlling a compass, including in combination, a magnetic compass, an azimuth gyroscope, and means for selectively linking the compass to the gyroscope.

7. A mechanism for controlling a compass including in combination a magnetic compass mounted in a vehicle, an azimuth gyroscope and pneumatic means for selectively linking the compass to the gyroscope.

8. A mechanism for controlling a compass, including in combination a magnetic compass, an azimuth gyroscope, and electrical means for selectively linking the compass to the gyroscope.

9. A mechanism for controlling a compass, including in combination, a magnetic compass, an azimuth gyroscope, and time-controlled means for periodically linking the compass to the gyroscope.

10. A mechanism for controlling a compass, including in combination, a magnetic compass, mounted in a vehicle, a gyroscope, and time-controlled means for intermittently linking the compass to the gyroscope.

11. In combination, a magnetic compass adapted to be mounted on a craft for normally free response to influences of the earth's magnetic field, directional control means disassociated from the compass, and means effective upon angular movement of the craft in azimuth for connecting the compass to said directional means to control the compass during such movement to obviate deviations of said compass produced by said angular movement of the craft which might otherwise occur.

12. In combination, a magnetic compass adapted to be mounted on a craft for normally free response to influences of the earth's magnetic field, gyroscopic directional control means disassociated from the compass, and means effective upon angular movement of the craft in azimuth for connecting the compass to said directional means to control the compass during such angular movement to obviate deviations of the compass produced by said angular deviation of the craft which otherwise might occur.

13. A mechanism for controlling a compass, including a magnetic compass mounted in a vehicle and adapted to normally respond to magnetic influences, a gyroscope mounted in the vehicle for relative movement therebetween, driving means for rotating the compass in azimuth relatively to the vehicle, and means actuated by the relative angular movement between the gyroscope and vehicle for controlling said driving means to operate the compass in a direction reverse to the angular movement to maintain it fixed in azimuth.

14. A mechanism for controlling a compass, including a magnetic compass mounted in a vehicle and adapted to normally respond to magnetic influences, a gyroscope mounted in the vehicle for relative angular movement therebetween, and means controlled by the gyroscope for turning the compass in azimuth proportionately and reversely to the angular movement between said gyroscope and the vehicle to maintain said compass fixed in azimuth.

15. In combination, a magnetic compass, a gyroscope normally disconnected from the compass, and means for periodically connecting the compass and gyroscope together for controlling the former by the latter.

16. In combination, a magnetic compass mounted in a vehicle for free response to magnetic influences, a gyroscope mounted in said vehicle for relative angular movement therebetween, and means effective upon said relative angular movement for connecting the compass and gyroscope together for controlling the former by the latter during said movement.

17. A method of controlling a magnetic compass mounted on a moving aircraft and subject to deviations caused by disturbing forces acting on the compass, which forces are produced by changes occurring in a factor contributing in the maintenance of a predetermined condition of flight of said aircraft, which method consists in subjecting said compass to gyroscopic control during the time that said changes are occurring, and releasing said compass from said gyroscopic control when said changes have ceased.

18. In combination, a magnetic compass mounted on an aircraft for normally free response to the earth's magnetic field and subject to deviations caused by disturbing forces acting on the compass, which forces are produced by changes in a factor contributing in the maintenance of a predetermined condition of flight of said aircraft, a gyroscope disassociated from the compass, and means responsive to said changes for connecting the compass and gyroscope together during the time that said changes are occurring.

19. In combination, a magnetic compass mounted on an aircraft for normally free response to the earth's magnetic field and subject to deviations caused by disturbing forces acting on the compass, which forces are produced by changes in a factor contributing in the maintenance of a predetermined condition of flight of said aircraft, an azimuth gyroscope disassociated from the compass, and means responsive to said changes for connecting the compass and gyroscope together during the time that said changes are occurring.

20. In combination, a magnetic compass mounted on a craft for normally free response to influences of the earth's magnetic field, directional control means disassociated from the compass, and means effective upon angular movement of the craft about one of its axes for connecting the compass and directional control means together to prevent deviations of said compass which otherwise might occur.

21. In combination, a magnetic compass mounted on a craft for normally free response to influences of the earth's magnetic field, gyroscopic directional control means disassociated from the compass, and means effective upon angular movement of the craft about one of its axes for connecting the compass and directional control means together to prevent deviations of said compass which otherwise might occur.

22. In combination, a magnetic compass having a compass card pivotally mounted for normally free response to the earth's magnetic field, directional control means disassociated from said card, and means effective upon the occurrence of a predetermined condition or effect which is adapted to cause a deviation of the card for connecting said card and directional control means together to prevent such deviations of said card which otherwise might occur.

23. In combination, a magnetic compass having a compass card pivotally mounted for normally free response to the earth's magnetic field, gyroscopic directional control means disassociated from said card, and means effective upon the occurrence of a predetermined condition or effect which is adapted to cause deviation of the card for connecting said card and directional control means together to prevent such deviations of said card which otherwise might occur.

24. In combination, a magnetic compass, a gyroscope normally disconnected from the compass, and means for connecting the compass and gyroscope together at selected times whereby the compass is normally free to respond to magnetic influences without gyroscopic restraint and is controlled by the gyroscope at the selected times only.

25. In combination, a magnetic compass, a gyroscope normally disconnected from the compass, and means for connecting and disconnecting the compass and gyroscope to and from each other for controlling the former by the latter while connected, to prevent deviations of the compass which would otherwise be produced.

26. The method of controlling a magnetic compass mounted in an aircraft for normally free response only to the earth's magnetic field while the craft is flying a straight course, which comprises subjecting the compass to gyroscopic control to hold the compass element substantially fixed while the craft is turning about one of its axes, and releasing said compass from said gyroscopic control when the aircraft has ceased turning.

27. The method of controlling a magnetic compass mounted in a vehicle for normally free response only to the earth's magnetic field, which comprises subjecting the compass to gyroscopic control to hold the compass element substantially fixed in azimuth while the vehicle is turning, and releasing said compass from said gyroscopic control when the aircraft has ceased turning.

28. A mechanism for controlling a compass, including in combination, a magnetic compass mounted in a vehicle and adapted to normally respond freely to magnetic influences, an azimuth gyroscope mounted in the vehicle, and means responsive to turning of the vehicle for connecting the compass to the gyroscope for maintaining the compass fixed in azimuth during the turning.

29. A method of controlling a magnetic compass in a vehicle, which comprises selectively subjecting the compass to gyroscopic control to hold the compass element substantially fixed in azimuth, and interveningly releasing the compass element to the influence of the earth's magnetic field.

30. The method of controlling a magnetic compass in a vehicle, which comprises periodically subjecting the compass to gyroscopic control to hold the compass element substantially fixed in azimuth, and interveningly releasing the compass element to the influence of the earth's magnetic field.

31. The method of controlling a magnetic compass in a vehicle, which comprises intermittently subjecting the compass to gyroscopic control to hold the compass element substantially fixed in azimuth, and interveningly releasing the compass element to the influence of the earth's magnetic field.

32. The method of controlling a magnetic compass, which comprises selectively subjecting the compass to and releasing the same from gyroscopic control to hold the compass element substantially fixed in azimuth.

33. The method of controlling a magnetic compass, which comprises periodically subjecting the compass to and releasing the same from gyroscopic control to hold the compass element substantially fixed in azimuth.

34. In combination, a direction indicating device for indicating the relative direction of a craft with respect to the magnetic meridian and which is subject to error during changes in heading of the craft, a directional gyroscope normally disconnected from the direction indicating device, and means for connecting and disconnecting the direction indicating device and the gyroscope to and from each other for controlling the former by the latter while connected, to prevent the error which would otherwise occur.

35. In combination, a free directional gyroscope, a compass card rotatably mounted adjacent said gyroscope, a driving element mounted on the gyroscope to turn in azimuth therewith and having a mechanical driving connection with said card to turn the latter as the gyroscope turns relative to its mounting, and means for interrupting said driving connection without disturbing said gyroscope.

36. In combination, a free directional gyroscope, an indicating card having side-reading graduations on the periphery thereof and rotatably mounted adjacent the gyroscope for rotation about a vertical axis, a driving element mounted on the gyroscope to turn in azimuth therewith and having a mechanical driving connection with the card to turn the latter as the gyroscope turns relative to its mounting, and means for interrupting said driving connection without disturbing the gyroscope.

FRANCIS A. WADE.
ADOLF URFER.